Sept. 22, 1964    J. SELBY    3,149,890
MACHINE BEARINGS
Filed July 6, 1962

INVENTOR
JAMES SELBY
By Hane and Nydick
ATTORNEYS

United States Patent Office 3,149,890
Patented Sept. 22, 1964

3,149,890
MACHINE BEARINGS
James Selby, Pinner, Middlesex, England, assignor to
B. Eliott & Company Limited, London, England
Filed July 6, 1962, Ser. No. 207,901
3 Claims. (Cl. 308—187)

This invention relates to bearing arrangements which include rotary bearings of the kind comprising inner and outer races, such as ball bearings and roller bearings.

The object of the invention is the provision of improved means for the cooling of such bearings, and features of the invention will sufficiently appear from the appended claims when read in the light of the following description of a preferred embodiment of the invention.

This embodiment of the invention which is described below by way of example only, comprises a bearing arrangement for supporting the horizontal spindle of a machine tool, and is illustrated in the accompanying drawings, in which—

Figure 1:
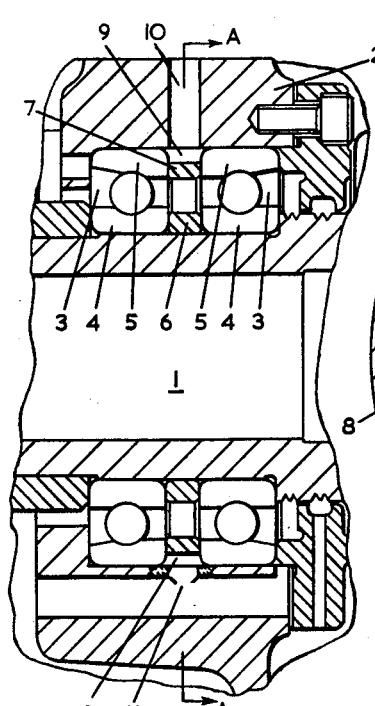
FIGURE 1 is a vertical cross section through the axis of the bearing for the machine spindle.
Figure 2:
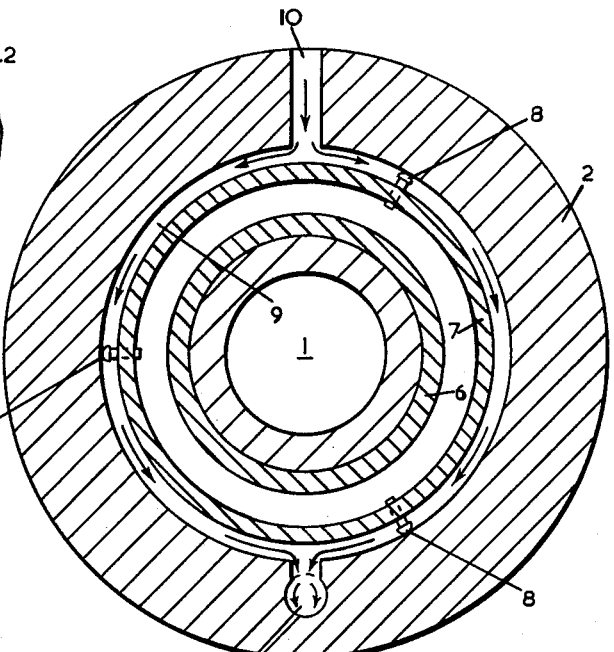
FIGURE 2 is a section of the line AA of FIGURE 1.

In the bearing arrangement illustrated, a horizontal machine tool spindle 1 is rotatably supported in a stationary housing 2 by means of two ball bearings 3, each of which comprises an inner race 4, mounted on the male cylindrical surface of the spindle 1, and an outer race 5 supported in the female cylindrical surface of the bore of the housing 2. The two inner races 4 are held spaced apart by a spacer ring 6 and the outer races 5 by a cylindrical sleeve 7.

The outer periphery of the sleeve 7 is held spaced from the bore of the housing, by means of three screws 8, so that there is formed an annular passage 9 bounded by the sleeve 7, the housing 2, and the adjacent side faces of the outer races 5. The housing is formed with an inlet 10 and an outlet 11 communicating with the passage 9, for the circulation of oil through the passage.

Oil circulating through the passage 9 has direct contact with the outer races 5 and is therefore very effective for keeping down the working temperature.

Figure 3:
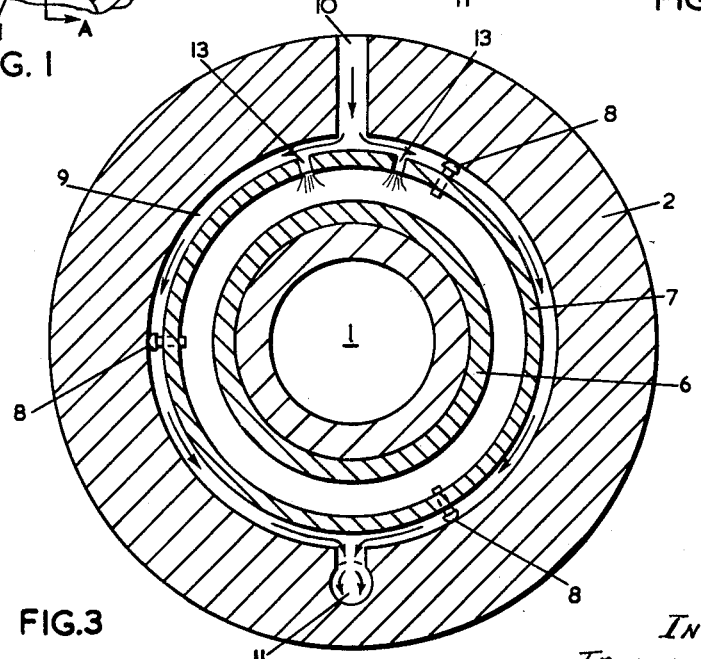
FIGURE 3 is a sectional view of a modification of the bearings shown in FIGURES 1 and 2.

As is shown in FIGURE 3, the sleeve 7 can have say two small radial holes 13 through it, and thus some oil is permitted to pass from the passage 9 into the space between the races and into contact with the balls and the bearing surfaces of the races for the purpose of lubrication.

It will be appreciated that the invention can be applied indifferently to rotary bearings whose bearing elements comprise balls or rollers. Other constructional details of the above described embodiment can of course be modified without departing from the scope of the appended claims.

I claim:
1. A bearing arrangement comprising two rotary bearings whose inner races are supported on a shaft and whose outer races are supported in a housing, a sleeve extending between the adjacent side faces of the outer races and spaced from the bore of the housing to form an annular passage for the flow of cooling liquid in contact with the outer races, and a liquid inlet and a liquid outlet to the passage through the wall of the housing.

2. A bearing arrangement in accordance with claim 1 wherein the said sleeve is apertured to allow the passage of liquid through the sleeve into contact with the bearing elements.

3. A bearing arrangement comprising two rotary bearings each including inner and outer races, said bearings being coaxially mounted between male and female cylindrical surfaces, and a sleeve extending axially between two adjacent races of said inner and outer races, said sleeve being spaced from one of the cylindrical surfaces to form a closed annular passage for a flow of cooling liquid in contact with said races, said one of the cylindrical surfaces including an inlet and an outlet communicating with said annular passage for circulating the cooling liquid through the passage.

References Cited in the file of this patent

UNITED STATES PATENTS

| | | |
|---|---|---|
| 1,776,272 | Sanders | Sept. 23, 1930 |
| 2,250,801 | Horger | July 29, 1941 |
| 2,548,229 | Mendenhall | Apr. 10, 1951 |
| 2,944,857 | Schneider | July 12, 1960 |

FOREIGN PATENTS

| | | |
|---|---|---|
| 1,177,187 | France | Dec. 1, 1958 |